(12) United States Patent
Ono et al.

(10) Patent No.: US 7,689,106 B2
(45) Date of Patent: Mar. 30, 2010

(54) VIDEO OR AUDIO RECORDING AND REPRODUCING APPARATUS

(75) Inventors: Hiroaki Ono, Fujisawa (JP); Shinichi Nonaka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1001 days.

(21) Appl. No.: 11/066,759

(22) Filed: Feb. 24, 2005

(65) Prior Publication Data

US 2006/0045494 A1 Mar. 2, 2006

(30) Foreign Application Priority Data

Aug. 31, 2004 (JP) ............................. 2004-251212

(51) Int. Cl.
| | |
|---|---|
| H04N 7/01 | (2006.01) |
| H04N 5/00 | (2006.01) |
| H04N 5/76 | (2006.01) |
| H04N 7/00 | (2006.01) |
| H04N 7/26 | (2006.01) |
| H04N 11/02 | (2006.01) |
| G11B 5/09 | (2006.01) |
| G11B 7/00 | (2006.01) |
| G11B 7/20 | (2006.01) |
| G11B 7/24 | (2006.01) |
| G11B 7/0045 | (2006.01) |
| G11B 20/12 | (2006.01) |
| G11B 21/08 | (2006.01) |
| G11B 27/36 | (2006.01) |

(52) U.S. Cl. ........................ 386/131; 386/33; 386/95; 386/111; 386/125; 386/126; 348/231.2; 369/30.1; 369/30.23; 369/44.27; 369/47.34; 369/53.24; 369/59.11; 369/59.25; 369/94; 369/275.3

(58) Field of Classification Search ................. 386/131, 386/33, 95, 111, 125, 126, E5.013, E9.013; 348/231.2; 369/94, 30.1, 53.24, 59.11, 59.25, 369/275.3, 286, 30.23, 47.34, 44.27; 375/E7.09, 375/E7.107, E7.189, 240.12, E7.268; 382/236; G9B/7.044, 7.102

See application file for complete search history.

(56) References Cited

U.S. PATENT DOCUMENTS 5,881,032 A * 3/1999 Ito et al. ................. 369/30.1

(Continued)

FOREIGN PATENT DOCUMENTS

JP 09-063190 A 3/1997

(Continued)

OTHER PUBLICATIONS

Japan Patent Office (JPO) office action for JPO patent application JP2004-251212 (Feb. 10, 2009).

*Primary Examiner*—Thai Tran
*Assistant Examiner*—Syed Y Hasan
(74) *Attorney, Agent, or Firm*—Townsend and Townsend and Crew LLP

(57) ABSTRACT

The same contents having different recording rates are recorded on a multi-layer disk. A plurality of contents or the same contents having different recording rates are independently recorded respectively in different layers of an optical disk having a plurality of recording layers. In order to record a plurality of contents or the same contents having different recording rates in parallel at that time, recording on the multi-layer optical disk is conducted by repeating an operation of dividing each content into recording units, recording a recording unit of one kind of information in a recording layer, and recording a recording unit of the other kind of information in a different recording layer.

15 Claims, 5 Drawing Sheets

U.S. PATENT DOCUMENTS

| | | |
|---|---|---|
| 6,370,091 B1 | 4/2002 | Kuroda |
| 6,614,846 B1 * | 9/2003 | Fujiwara et al. ........ 375/240.16 |
| 6,701,063 B1 * | 3/2004 | Komoda et al. ............... 386/95 |
| 6,876,617 B1 | 4/2005 | Huma |
| 2002/0027842 A1 * | 3/2002 | Komma et al. ........... 369/44.27 |
| 2002/0176701 A1 * | 11/2002 | Noguchi et al. ............... 386/95 |
| 2003/0031454 A1 * | 2/2003 | Kameyama ................. 386/33 |
| 2004/0105351 A1 * | 6/2004 | Ueki ....................... 369/30.23 |
| 2004/0120241 A1 * | 6/2004 | Kobayashi et al. ............ 369/94 |
| 2004/0156294 A1 * | 8/2004 | Watanabe et al. ............. 369/94 |
| 2005/0036550 A1 * | 2/2005 | Koba et al. ............. 375/240.12 |
| 2005/0105438 A1 * | 5/2005 | Hibino et al. ............. 369/59.12 |

FOREIGN PATENT DOCUMENTS

| | | |
|---|---|---|
| JP | 10-294927 | * 11/1998 |
| JP | 10-294927 A | * 11/1998 |
| JP | 2001-024929 | 1/2001 |
| JP | 2002-344892 | 11/2002 |

\* cited by examiner

VIDEO OR AUDIO RECORDING AND REPRODUCING APPARATUS

INCORPORATION BY REFERENCE

The present application claims priority from Japanese application JP 2004-251212 filed on Aug. 31, 2004, the content of which is hereby incorporated by reference into this application.

BACKGROUND OF THE INVENTION

1. Field of the Invention

The present invention relates to a video or audio recording and reproducing apparatus for multi-layer optical disks.

2. Description of the Related Art

In recent years, shift from tape recording such as VTR recording to disk recording using, for example, DVDs and hard disk drives (HDDs) is being conducted rapidly, because of digitization of images and sounds in the world of video and audio information and improvement of the compression technique for video and audio data. As a representative disk recorder, an HDD&DVD hybrid recorder having a mixture of a hard disk drive (hereafter referred to as HDD) and a DVD drive can be mentioned. This temporarily records video information or audio information supplied from, for example, a broadcasting station or an external input terminal on an HDD, and then records it on a DVD disk in a backup form or the like when preservation is desired. Or the HDD&DVD hybrid recorder records the video information or audio information directly on the DVD disk. In recent years, the HDD&DVD hybrid recorder is sold by various companies, and it is a product growing and forming a large market.

Here, the HDD has a capacity of 80 GB to several hundreds GB. The DVD disk has a capacity of approximately 4.7 GB per disk. As representative DVD disks, there are, for example, digital video disks (hereafter abbreviated to DVD-Video) which are video optical disks for movies or the like, and DVD-ROMs applied to application software, game software and various data recording for computer use. As media for DVD recorders used to conduct backup recording of personal information and to be substituted for VTRs, there are rewritable optical recording media using optical disks such as DVD-RAMs, DVD±RWs and DVD±Rs.

On the other hand, high definition video or audio contents in Hi-Vision broadcasting including digital terrestrial broadcasting are being delivered, and a demand for recording high picture quality or high sound quality information is growing. However, high picture quality or high sound quality information is accordingly high in amount of information. Even if, in the conventional MPEG-2 technique, image data with sound having, for example, image data with sound of the SD quality is recorded at a variable rate of 10 Mbps at maximum, a two-hour program becomes approximately 4.7 GB at maximum in amount of information when the average rate in recording is approximately 5 Mbps. Therefore, it becomes possible to record the two-hour program on one DVD disk having a diameter of 12 cm. In the case of the HD in the digital terrestrial broadcasting, however, the average rate cannot be made less than 15 Mbps in the conventional MPEG-2 because of the balance with the picture quality, even if the compression factor is made large. Therefore, a two-hour program in the HD in the digital terrestrial broadcasting cannot be recorded on a single DVD disk. Even if, for example, the Blu-ray disk is popularized in the near future and optical disk media having a capacity of at least 25 GB per disk are implemented, video contents corresponding to at least two hours and a half cannot be recorded on one disk with a high picture quality mode of, for example, 2 Mbps.

On the other hand, although the HD quality needs 25 Mbps in the conventional MPEG-2, a sufficient HD quality is obtained at approximately 15 Mbps in, for example, H.264 system of MPEG-4 because of a recent advance of the compression technique. In addition, a sufficient HD quality is obtained even at 8 Mbps. At the same time, the SD quality becomes considerably good even at approximately 4 Mbps. It becomes also considerable to record several channels of broadcasting or the same contents having different recording rates at a time, when the digital terrestrial broadcasting has been popularized. A use in which contents with the HD quality and contents with the SD quality are recorded on one disk is also considerable. In this case, for example, a low picture quality is used for delivery and a high picture quality is used for preservation.

In the conventional techniques, there are techniques concerning a method of recording video or audio data of a plurality of channels on an HDD at the same time and techniques concerning a method of recording still picture information in, for example, a digital camera by using two compression systems. As this example, there are JP-A-2002-344892 and JP-A-2001-24929.

SUMMARY OF THE INVENTION

As described above, high definition video or audio contents in Hi-Vision broadcasting including digital terrestrial broadcasting are being delivered, and a demand for recording high picture quality or high sound quality information is growing. In addition, a demand for recording multi-channel contents at a time or recording the same contents having different recording rates at a time is growing.

When recording multi-channel contents at a time or recording the same contents having different recording rates at a time, recording is conducted while the optical pickup is moving to various places on the disk. It is not possible to obtain a recording rate enough to conduct multi-channel recording with an optical pickup which is originally large in mass and which requires time to move accordingly. As a result, it is not possible to implement recording those contents on an optical disk at a time. Furthermore, noise caused by the movement of the optical head is large and this becomes a cause of deterioration of the product quality.

On the other hand, the future trend of optical disks in both DVDs and Blu-ray disks is a trend of multi-layer implementation, and the capacity is further increased. However, the above-mentioned JP-A-2002-344892 and JP-A-2001-24929 do not disclose a technique for conducting recording on a multi-layer optical disk.

An object of the present invention is to provide a video or audio recording apparatus capable of recording the same content having different recording rates on a multi-layer recording medium, recording contents of several kinds or the same contents having different recording rates in parallel on an optical disk.

In a video or audio recording and reproducing apparatus including information conversion means for converting video or audio information to video or audio data to be recorded on an optical disk, recording means for recording the video or audio data on the optical disk, and reproducing means for reproducing the video or audio data recorded on the optical disk, therefore, the video or audio information is converted to video or audio data of at least two kinds differing in recording rate and the video or audio data of at least two kinds differing in recording rate are recorded on the optical disk, and in addition, the optical disk has at least two recording layers and the video or audio data of at least two kinds differing in recording rate are recorded in different layers of the optical disk.

The video or audio recording and reproducing apparatus according to the present invention uses a multi-layer recording medium, and records a plurality of contents or the same contents having different recording rates in different layers while using movement of an optical head between layers (interlayer jump). At this time, the video or audio recording and reproducing apparatus conducts recording on a multi-layer optical disk by repeating an operation of dividing each data into recording units, recording a recording unit of one kind of information in a recording layer, shifting to a different recording layer by means of an interlayer jump and recording a recording unit of the other kind of information.

Here, it is made possible to record several kinds of contents or the same contents having different recording rates on the optical disk in parallel. Here, "recording in parallel" means dividing each data into recording units, recording one recording unit in one recording layer, shifting to a different recording layer by means of an interlayer jump, and recording a different recording unit.

By recording the same contents having different recording rates on a multi-layer recording medium, or recording a plurality of contents or the same contents having different recording rates in layers of a medium in parallel, the seeking time can be reduced and the recording time can be shortened.

Other objects, features and advantages of the invention will become apparent from the following description of the embodiments of the invention taken in conjunction with the accompanying drawings

DESCRIPTION OF THE EMBODIMENTS

Hereafter, embodiments of the present invention will be described with reference to FIGS. 1 to 6.

Figure 1:
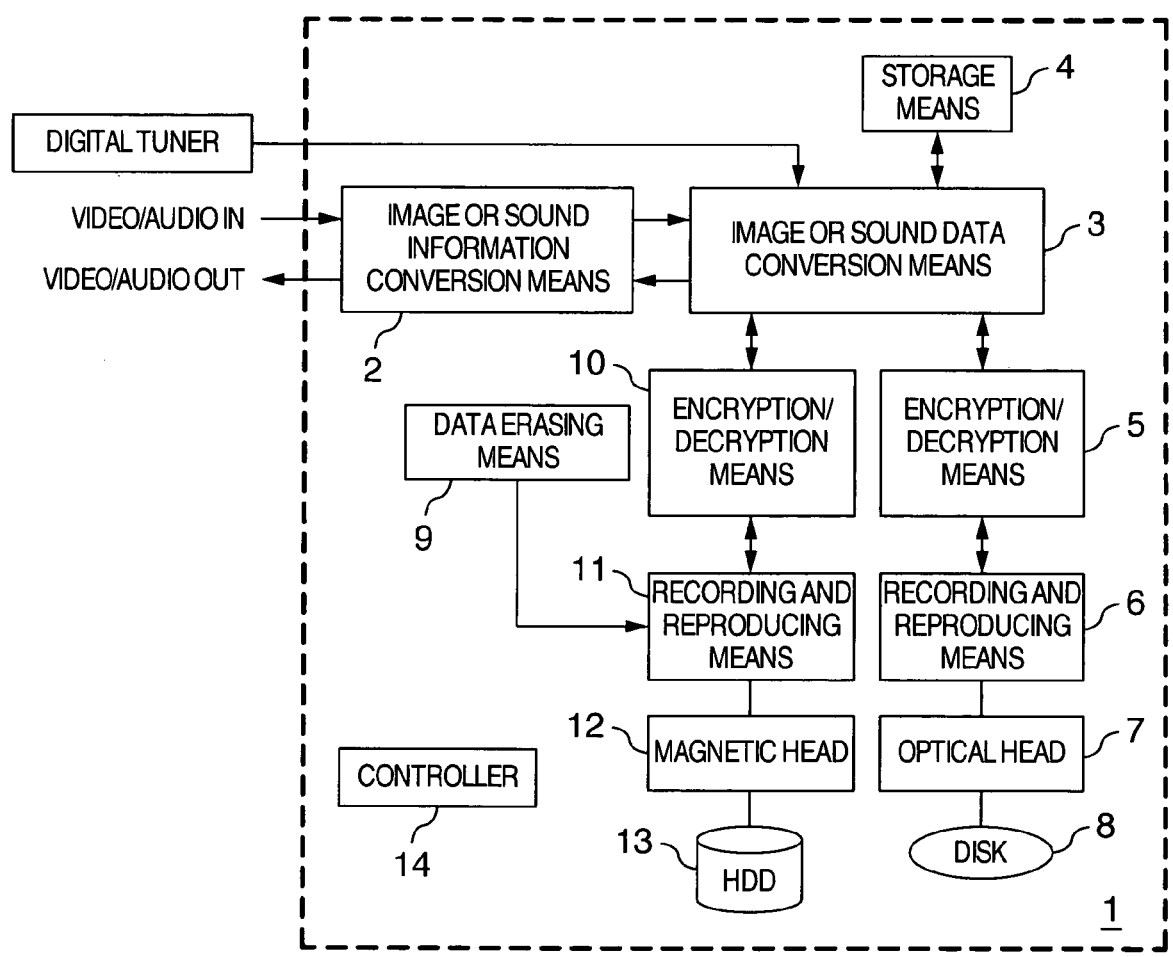
FIG. 1 is a system block diagram of an embodiment according to the present invention.

FIG. 1 shows a schematic configuration of a video or audio recording and reproducing apparatus 1 (surrounded by a broken line) which is an embodiment of the present invention.

An image or sound information conversion means 2 conducts compression encoding processing using, for example, the MPEG system (such as a system of MPEG-2, MPEG-4 or H.264) on an external analog signal such as Video IN to convert image or sound information to digital data, or conducts decoding processing on digital data to convert the digital data to an analog signal and outputs the analog signal to a monitor or the like from an external analog terminal such as Video OUT.

An image or sound data conversion means 3 is means for converting video or audio data subjected to analog-digital conversion to data to be recorded on a recording medium such as an HDD or an optical disk. The image or sound data conversion means 3 conducts processing such as ECC addition, modulation and demodulation depending on the disk apparatus. Since a signal supplied from a digital terrestrial tuner is already subjected to the analog-digital conversion, the signal is input to the image or sound data conversion means 3 as it is. It is now supposed that the signal is to be recorded on the HDD. If the video or audio information is information restricted in recording by copyright or the like, the data is subjected to corresponding cipher processing in an encryption/decryption means 10, passed through an HDD recording and reproducing means 11, and recorded on a hard disk 13 via a magnetic head 12. Subsequently, it is supposed that the signal is to be recorded on the optical disk. If the video or audio information is information restricted in recording by copyright or the like, the data is subjected to corresponding cipher processing in an encryption/decryption means 5, passed through an optical disk recording and reproducing means 6, and recorded on an optical disk 8 via an optical head 7. The whole of them is controlled by a controller 14.

The function of converting one input content to at least two kinds of information differing in compression factor is performed by the image or sound information conversion means 2 shown in FIG. 1. The compression factor is changed every some unit in the content. Resultant information is sent to the image or sound data conversion means 3, then sent to the hard disk or the optical disk, and recorded thereon.

Figure 2A:
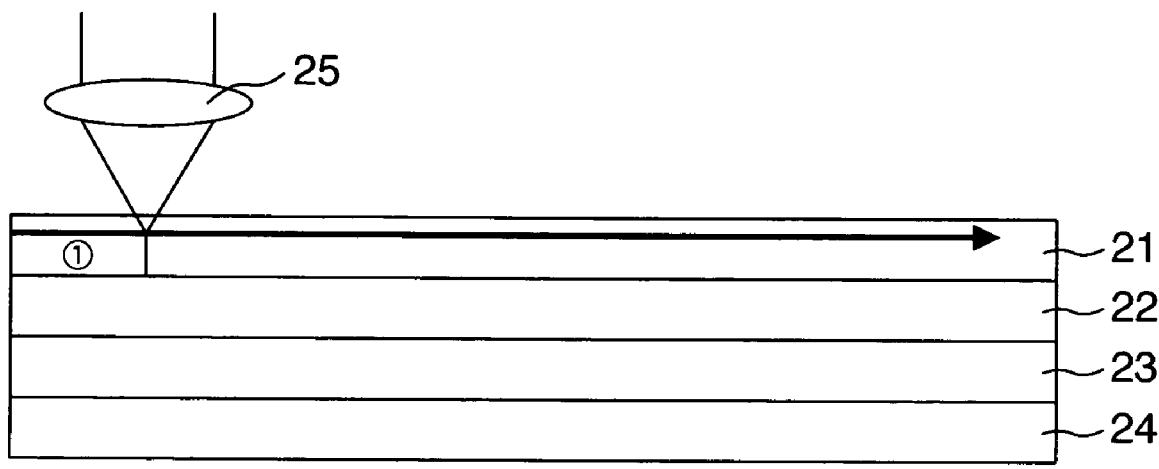
FIGS. 2A and 2B are diagrams showing a method of recording on a multi-layer optical disk in an embodiment according to the present invention.
Figure 2B:
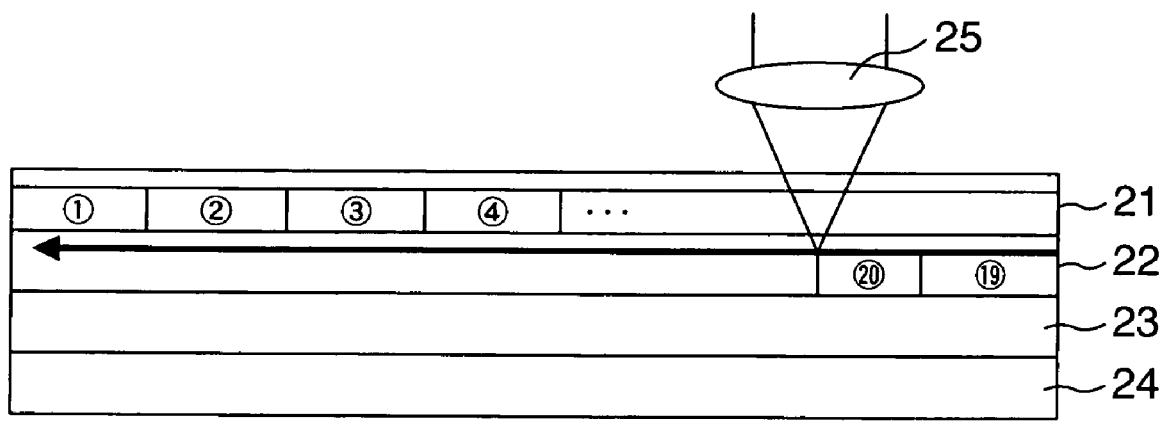
Figure 3A:
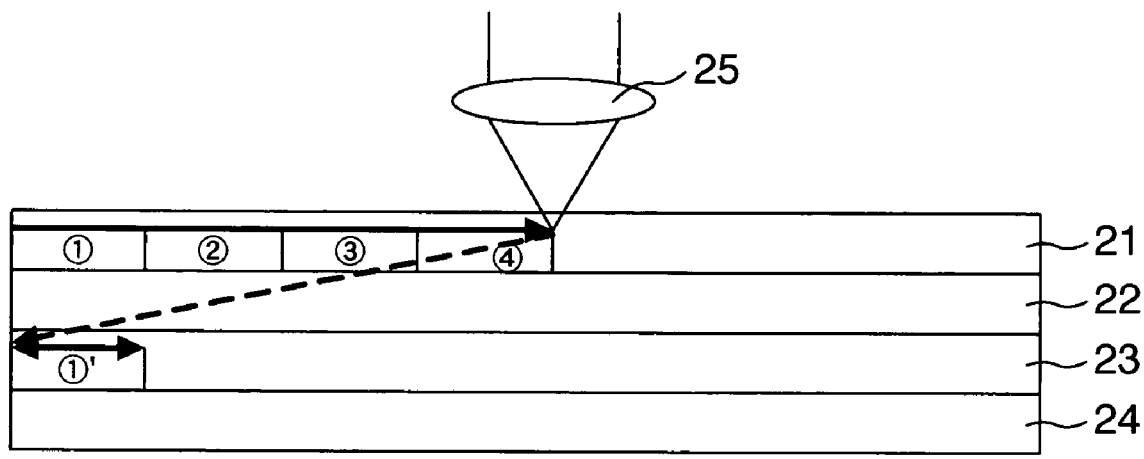
FIGS. 3A and 3B are diagrams showing a method of recording on a multi-layer optical disk in another embodiment according to the present invention.
Figure 3B:
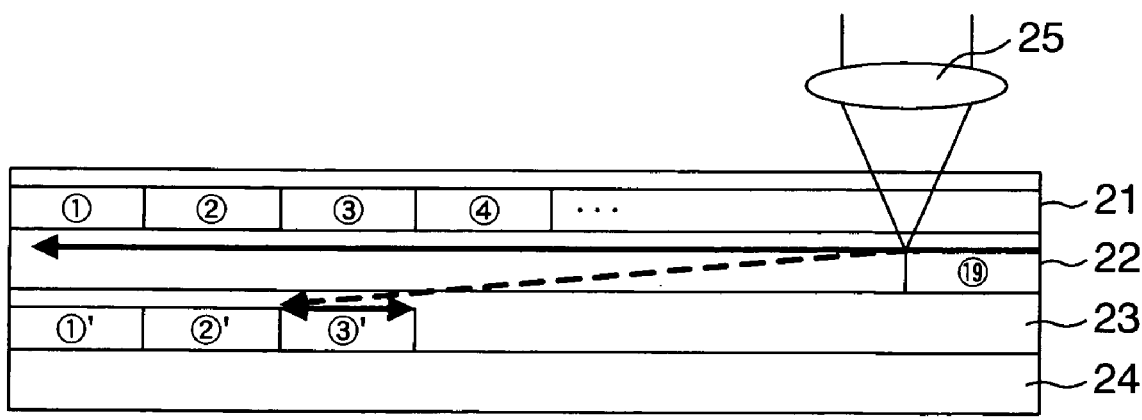

The method of recording data on the optical disk by using the optical head will now be described with reference to FIGS. 2A and 2B. FIGS. 2A and 2B show the case of an optical disk having four recording layers. As for the number of layers, an optical disk having at least two layers is a multi-layer optical disk, and a similar recording method can be applied. In FIGS. 2A and 2B, the optical head is disposed over the disk and the optical disk has first to fourth layers beginning with the top layer. This is not restrictive, but the optical head may be located under the disk and the optical disk may have first to fourth layers beginning with the bottom layer. In the multi-layer optical disk, recording in the first layer is conducted from an inner circumference side to an outer circumference side, and an interlayer jump is conducted to shift to the next layer. Recording in the second layer is conducted from the outer circumference side to the inner circumference side. When recording information converted with a plurality of compression factors, therefore, a recording area is previously secured and information is recorded thereon successively beginning with the head of the recording area. For example, when recording information of a first compression factor sequentially every some recording unit, (1) is recorded on the inner circumference side as shown in FIG. 2A. Thereafter, (2), (3) and (4) are recorded as shown in FIG. 2B. Thereafter, recording is conducted as far as a recording end position on the outer circumference. Then, an interlayer jump to the second layer is conducted, and sequential recording is conducted as represented by (19), (20) and so on. In FIGS. 2A and 2B, the recording unit has a certain predetermined value. However, this is not restrictive, but the lengths of the recording units may be suitably determined, respectively. Furthermore, although the second layer begins with the recording unit (19), this is not restrictive. When recording information of a second compression factor on the optical disk, (1) to (4)

in the information of the first compression factor are recorded as shown in FIG. 3A. Thereafter, seeking and an interlayer jump are conducted to record information of the second compression factor, and information (1)' is recorded. Thereafter, the information of the first compression factor and the information of the second compression factor are alternately recorded. After the information of the first compression factor is recorded up to (19) as shown in FIG. 3B, seeking and an interlayer jump are conducted to record information of the second compression factor, and information (4)' is recorded. The above-described case shows the case where the second compression factor is larger than the first compression factor. When recording information of a plurality of compression factors in parallel, recording is thus conducted while largely moving an optical head having a large mass (conducting seeking), and consequently the seeking time becomes long and a sufficient recording rate cannot be obtained. As a result, it is difficult to record a plurality of kinds of information differing in compression factor in parallel.

Figure 4A:
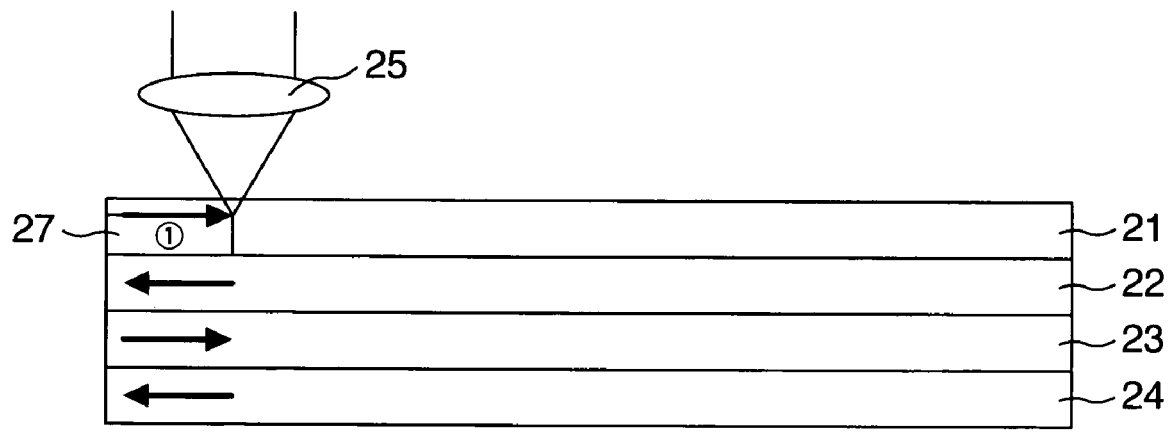
FIGS. 4A and 4B are diagrams showing a method of recording on a multi-layer optical disk in still another embodiment according to the present invention.
Figure 4B:
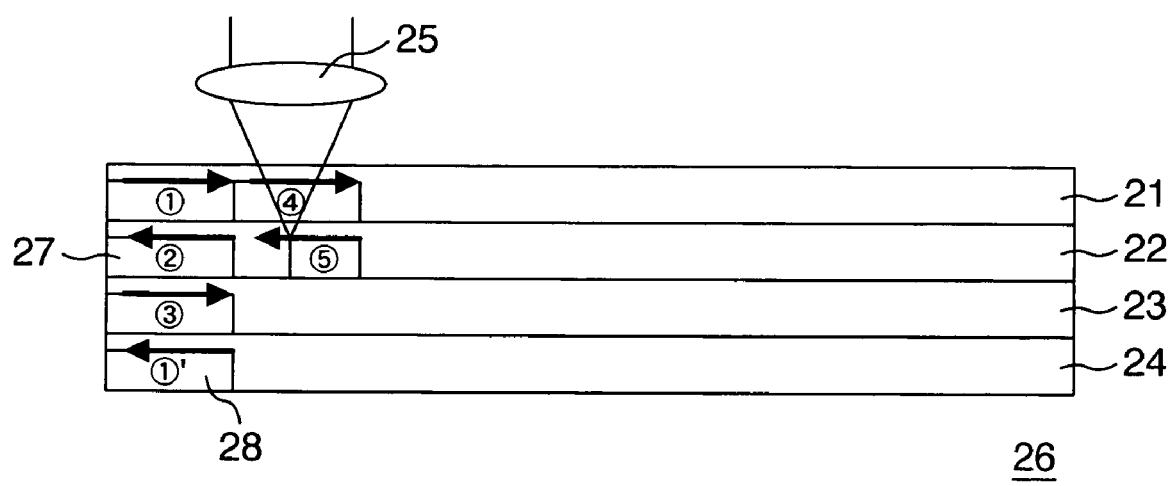

In a different embodiment, therefore, a plurality of kinds of information are recorded in parallel on the multi-layer optical disk by dividing each kind of information into recording units, and repeating an operation of recording a recording unit of information of a first compression factor in one recording layer, shifting to a different recording layer by means of an interlayer jump, and recording a recording unit of information of a second compression factor. This embodiment is shown in FIGS. 4A and 4B. In FIGS. 4A and 4B, a method of converting one content to information having two different recording rates, i.e., information having a high picture quality and information having a low picture quality, dividing each information into recording units, and recording the two kinds of information on the optical disk is shown. In the embodiment shown in FIGS. 4A and 4B, one content is converted to two kinds of information having two different recording rates and they are recorded. Alternatively, two different contents may be divided into recording units and recorded on the optical disk in parallel.

In FIGS. 4A and 4B, even one recording unit in the information having the high picture quality is recorded extending over three layers because the amount of information is large. Information having the low picture quality is recorded in only the fourth layer because the amount of information is small. In the first layer, recording is conducted from the inner circumference side to the outer circumference side. A shift to the next layer is conducted by means of an interlayer jump. In the second layer, recording is conducted from the outer circumference side to the inner circumference side. A shift to the next layer is conducted by means of an interlayer jump. In the third layer, recording is conducted from the inner circumference side to the outer circumference side. An interlayer jump is conducted in the same way. In the fourth layer, recording is successively conducted from the outer circumference side to the inner circumference side.

In any case, recording is conducted so as to extend over a plurality of layers. In the shift (interlayer jump) of the optical head to each layer, however, a head actuator shifts by a micron order in the focus direction. As compared with the so-called seeking that moves the optical head having a considerably large mass, therefore, the shift time is overwhelmingly short.

By the way, depending on the relation in the amount of information, it is also possible to contrive a method of conducting recording every other time (or every (N+1)th time) such as recording high picture quality information in the first to fourth layers this time and recording high picture quality information in the first to third layers and low picture quality information in the fourth layer the next time.

When, for example, recording data of two kinds differing in recording rate in parallel, the seeking time, and consequently the recording time, can be reduced by recording data in respective layers.

Figure 5:
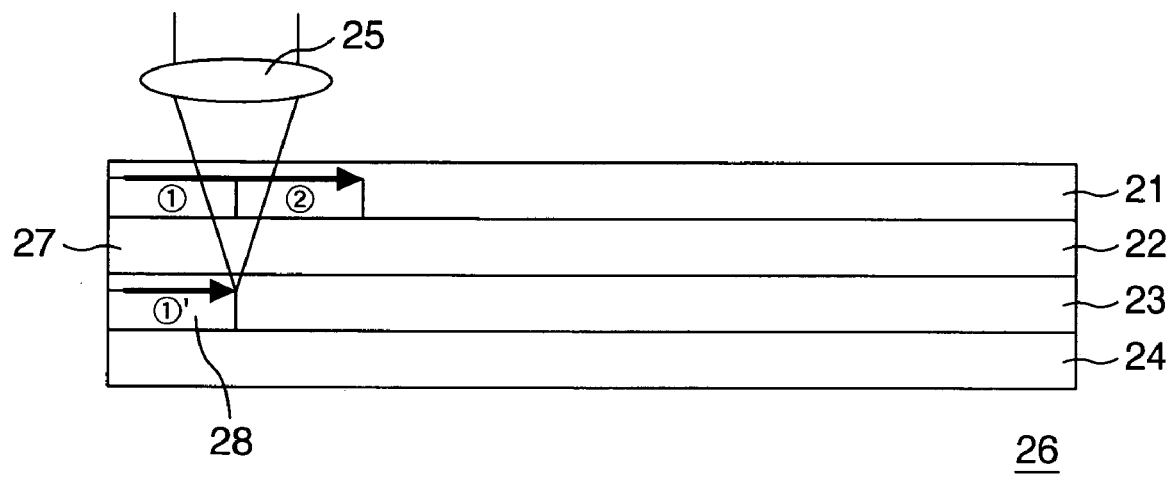
FIG. 5 is a diagram showing a method of recording on a multi-layer optical disk in yet another embodiment according to the present invention.

FIG. 5 shows the case where information obtained by converting one content into two kinds differing in recording rate, i.e., information differing in compression factor is recorded. In this case, recording layers in the same direction are used. For example, in the example shown in FIG. 5, the first layer and the third layer are used, and a recording unit is recorded in one direction while finely dividing it. FIG. 5 differs from FIGS. 2A and 2B in that the recording unit is recorded in one direction in every other layer. In the above-described method, one content is converted into two kinds of data differing in compression factor and they are recorded. However, this is not restrictive, but two different contents may be divided respectively into recording units and recorded on the optical disk in parallel.

When recording four contents or four kinds of information differing in compression factor, an interlayer jump is conducted every two contents or two kinds of information differing in compression factor, although not illustrated. In the first and third layers, recording is conducted from the inner circumference side to the outer circumference side. The remaining two contents or two kinds of information differing in compression factor are recorded in the second and fourth layers from the outer circumference side to the inner circumference side.

Figure 6:
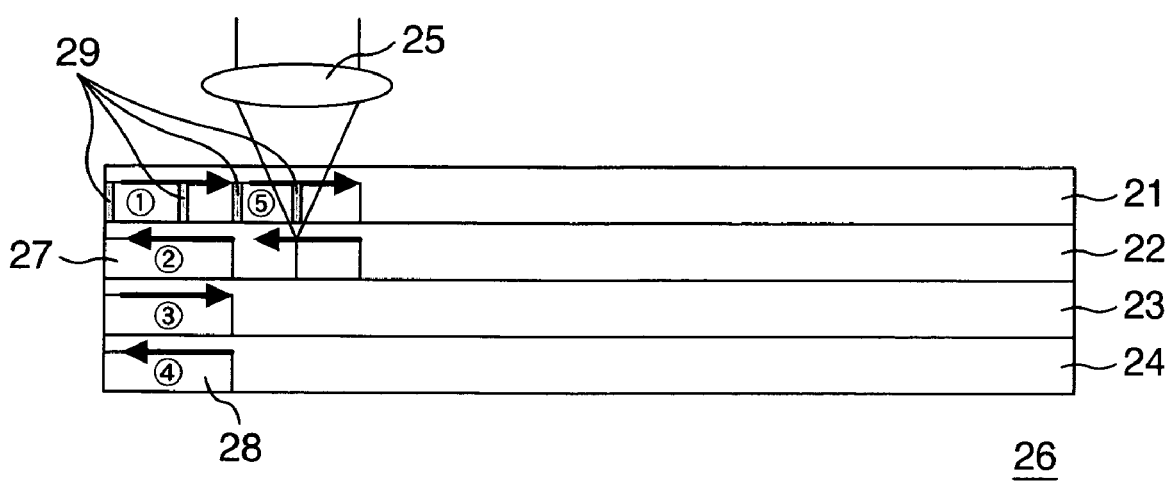
FIG. 6 is a diagram showing a method of recording on a multi-layer optical disk in still yet another embodiment according to the present invention.

FIG. 6 shows another embodiment of the present invention. This shows a way of making the fast search further fast. In the conventional technique, information is recorded continuously in one layer. Therefore, GOPs (Group of picture) are continuously recorded. As a result, data for fast search formed of head I pictures of respective GOPs are present at intervals, and the distance up to its appearance is long. Accordingly, there is a limit in the search rate. On the other hand, in the present invention, the first I picture to be used for fast search in a GOP is recorded collectively in the same layer (the first layer 21 in FIG. 6). By doing so, I pictures for fast search concentrate in one recording layer when conducting fast search. Therefore, its emergence interval becomes short and the fast search becomes faster. On a calculation, the fast search becomes fast according to multiplication by the number of layers. Therefore, the convenience of user's use is improved.

Furthermore, if the layer in which I pictures located at heads of GOPs are recorded is the same as the layer in which administrative information of the disk is recorded, the fast search becomes faster.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video or audio recording and reproducing apparatus comprising:
    an information converter which converts an identical content into video or audio data of a first recording rate and video or audio data of a second recording rate that is different from the first recording rate to be recorded on an optical disk;
    a recorder which records the video or audio data of the first recording rate and the video or audio data of the second recording rate on the optical disk; and a reproducer which reproduces the video or audio data recorded on the optical disk, wherein when the optical disk has at least three recording layers, then the recorder:

records the video or audio data of the first recording rate in a first radial region on a first layer of the optical disk;

makes an inter-layer jump to a second layer of the optical disk different from said first layer;

records the video or audio data of the second recording rate in the first radial region on said second layer, makes an inter-layer jump to a third layer of the optical disk different from the first and second layers, records the video or audio data of the second recording rate on the third layer in the first radial region, and after recording in the first radial region, records the data of the first recording rate or the second recording rate in a second radial region different from the first radial region.

2. The video or audio recording and reproducing apparatus according to claim 1, wherein the first recording rate is higher than the second recording rate.

3. The video or audio recording and reproducing apparatus according to claim 1, wherein the recorder records the video or audio data of the first recording rate on a number of layers greater than a number of layers on which the video or audio data of the second recording rate is recorded.

4. The video or audio recording and reproducing apparatus according to claim 1, wherein the recorder divides the video or audio data of the first recording rate into a plurality of first information units and divides the video or audio data of the second recording rate into a plurality of second information units, wherein the first information units and the second information units are recorded on the optical disk in alternating fashion.

5. The video or audio recording and reproducing apparatus according to claim 4, wherein the recorder records to the optical disk so that recording directions in adjacent layers of the optical disk are opposite to each other.

6. A video or audio recording and reproducing apparatus according to claim 5, wherein in a next layer adjacent to a layer in which recording has been conducted from an inner circumference to an outer circumference of the optical disk, recording is conducted from the outer circumference to the inner circumference, and in a next layer adjacent to a layer in which recording has been conducted from the outer circumference to the inner circumference of the optical disk, recording is conducted from the inner circumference to the outer circumference.

7. The video or audio recording and reproducing apparatus according to claim 1, wherein the recorder divides the video or audio data of the first recording rate into a plurality of first information units and divides the video or audio data of the second recording rate into a plurality of second information units, wherein the first information units are recorded on the first layer and the second layer of the optical disk and the second information units are recorded on the third layer of the optical disk.

8. The video or audio recording and reproducing apparatus according to claim 1, wherein when the optical disk has three layers for recording, then the recorder:

divides the video or audio data of the first recording rate into a plurality of first information units;

divides the video or audio data of the second recording rate into a plurality of second information units; and records the first information units on a number of layers greater than a number of layers on which the second information units are recorded.

9. The video or audio recording and reproducing apparatus according to claim 1, wherein the recorder gathers a plurality of I pictures located at head of a GOP of the video or audio data of the second recording rate and records the plurality of I pictures in an area on one of the at least two layers of the optical disk.

10. The video or audio recording and reproducing apparatus according to claim 1, wherein the recorder records the video or audio data of the first recording rate on a number of layers of the optical disk greater than a number of layers on which the video or audio data of the second recording rate is recorded.

11. The video or audio recording and reproducing apparatus according to claim 1, wherein then the recorder divides the video or audio data of the first recording rate into a plurality of first information units and divides the video or audio data of the second recording rate into a plurality of second information units, wherein the first information units are recorded on a total number of layers of the optical disk greater than a total number of layers on which the second information units are recorded.

12. A method of recording audio and/or video content to an optical disk, the method comprising:

receiving the content at an input of a recording apparatus;

generating first and second recording units from the content such that the first recording units correspond to a first information rate and the second recording units correspond to a second information rate;

determining three or more layers of the optical disk for writing the first recording units in a first radial region and a first recording direction;

writing a plurality of the first recording units to the optical disk in the first radial region and the first recording direction;

changing to a second layer of the optical disk when writing the plurality of first recording units is complete;

writing one or more of the second recording units to the second layer of the optical disk in the first radial region and a second recording direction;

changing to a third layer of the optical disk when writing the one or more second recording units is complete; and writing at least one of the first or second recording units to the third layer of the optical disk in a second radial region different from the first radial region.

13. The method of claim 12, wherein the three or more layers comprise non-sequential layers of the optical disk.

14. The method of claim 13, wherein the first recording direction comprises a direction from an inner circumference side of the optical disk to an outer circumference side of the optical disk.

15. The method of claim 13, wherein a size of the first recording units is larger than a size of the second recording units.

* * * * *